US011422918B2

(12) United States Patent
Aouad

(10) Patent No.: US 11,422,918 B2
(45) Date of Patent: Aug. 23, 2022

(54) CONTINUOUS DEVELOPMENT AND DELIVERY SYSTEM

(71) Applicant: Business Objects Software Ltd., Dublin (IE)

(72) Inventor: Mohamed Badreddine Aouad, San Jose, CA (US)

(73) Assignee: Business Objects Software Ltd., Dublin (IE)

( * ) Notice: Subject to any disclaimer, the term of this patent is extended or adjusted under 35 U.S.C. 154(b) by 54 days.

(21) Appl. No.: 16/421,075

(22) Filed: May 23, 2019

(65) Prior Publication Data
US 2020/0371898 A1 Nov. 26, 2020

(51) Int. Cl.
G06F 9/44 (2018.01)
G06F 11/36 (2006.01)
G06F 8/71 (2018.01)
G06F 8/65 (2018.01)

(52) U.S. Cl.
CPC ............ *G06F 11/3616* (2013.01); *G06F 8/65* (2013.01); *G06F 8/71* (2013.01); *G06F 11/3688* (2013.01); *G06F 11/3692* (2013.01)

(58) Field of Classification Search
CPC ............. G06F 11/3616; G06F 11/3688; G06F 11/3692; G06F 8/65; G06F 8/71
See application file for complete search history.

(56) References Cited

U.S. PATENT DOCUMENTS

| 2008/0250392 | A1* | 10/2008 | Petri | G06F 8/71 |
| | | | | 717/120 |
| 2010/0269094 | A1* | 10/2010 | Levenshteyn | G06F 8/20 |
| | | | | 717/109 |
| 2018/0095869 | A1* | 4/2018 | Peer | G06F 11/3684 |
| 2019/0097942 | A1* | 3/2019 | Gao | H04L 43/0876 |
| 2020/0004519 | A1* | 1/2020 | Ryall | G06F 8/60 |
| 2020/0073649 | A1* | 3/2020 | Viana | G06F 9/45504 |
| 2020/0097662 | A1* | 3/2020 | Hufsmith | H04L 67/10 |
| 2020/0125344 | A1* | 4/2020 | Varghese | G06F 8/10 |
| 2020/0125485 | A1* | 4/2020 | Wiener | G06F 11/3466 |
| 2020/0183766 | A1* | 6/2020 | Kumar-Mayernik | |
| | | | | H04L 9/3239 |

(Continued)

*Primary Examiner* — Chat C Do
*Assistant Examiner* — Lenin Paulino
(74) *Attorney, Agent, or Firm* — Schwegman Lundberg & Woessner, P.A.

(57) ABSTRACT

Disclosed are systems, methods, and non-transitory computer-readable media for a continuous software development and delivery system. Currently, the software development and delivery process is complicated and time consuming. The process requires multiple checkpoints and human intervention to ensure that software updates do not cause errors in the existing software when implemented. Coordination throughout the development process is also problematic as developers may be using varying development environment that are different than the environment used to test and produce the software. The continuous development and delivery system of the present disclosure remedies these issues by providing a consistent development environment throughout the development process. This reduces issues that may arise from use of inconsistent development environments and allows for automation of previously manual portions of the software development and delivery process.

15 Claims, 6 Drawing Sheets

(56) References Cited

U.S. PATENT DOCUMENTS

2020/0202006 A1* 6/2020 Shah .................... G06F 8/71
2020/0250074 A1* 8/2020 Zhang ................ G06F 11/3688

\* cited by examiner ced as examples, see the full layout.

CONTINUOUS DEVELOPMENT AND DELIVERY SYSTEM

TECHNICAL FIELD

An embodiment of the present subject flatter relates generally to software development and, more specifically, to a continuous software development and delivery system.

BACKGROUND

Software development and delivery is the process of developing and delivering updates to a software application. A primary concern during this process is protecting the functioning of the software application when implementing the update. To this end, the update is reviewed and tested extensively prior to implementation to ensure that the update will not have an undesired result on the software application. Currently, this process is complicated and time consuming; requiring multiple checkpoints and human intervention. Accordingly, improvements are needed.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
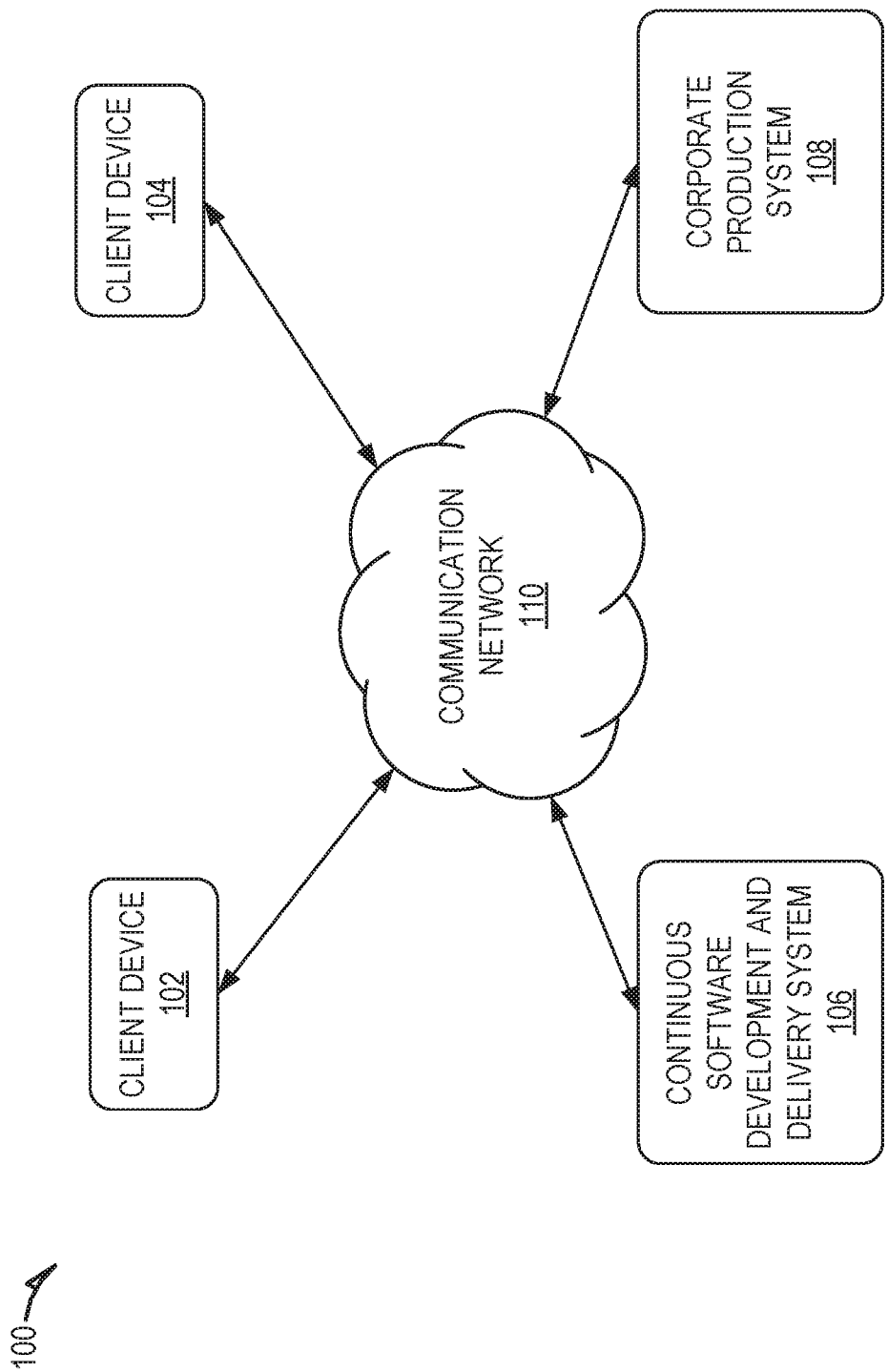
FIG. 1 shows a system wherein a continuous software development and delivery system automates the software development and delivery process, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for a continuous software development and delivery system. Currently, the software development and delivery process is complicated and time consuming. The process requires multiple checkpoints and human intervention to ensure that software updates do not cause errors in the existing software when implemented. Coordination throughout the development process is also problematic as developers may be using varying development environment that are different than the environment used to test and produce the software. The continuous development and delivery system of the present disclosure remedies these issues by providing a consistent development environment throughout the development process. This reduces issues that may arise from use of inconsistent development environments. The continuous development and delivery system also automates previously manual portions of the software development and delivery process, further simplifying and streamlining the process.

The continuous development and delivery system uses containers running unified container images to provide a consistent development environment throughout the software development and delivery process (e.g., from the developer workstation to the continuous development and delivery system and the corporate production system). For example, the containers generated on the developer workstations and the continuous development and delivery system run a consistent container image that is as close as possible to the container image used by the corporate production system. A container image is an unchangeable, static file that includes executable code to an isolated process on a computing device. The image is comprised of system libraries, system tools and other platforms settings a software program uses to run on a containerization platform such as Docker.

The continuous development and delivery system generates a container on the developer's client device using a container image selected from a set of unified container images (e.g., unified docker images) maintained in a central container image repository. The source code and dependencies for a software application are pulled into the running container, allowing the developer to begin work on creating updates to the software application in the generated developer environment.

A consistent developer environment is also used during testing of the software developed by the developer. For example, the developer provides an updated version of the source code to the continuous development and delivery system for testing. In response to receiving the updated version of the source code, the continuous development and delivery system generates a container using the same selected container image from the central container image repository that was used to generate the container image on the developer device. The continuous development and delivery system may run the tests on the updated version of the source code using the developer environment provided by the running container. As a result, the software update is developed and tested in a consistent development environment, thereby eliminating issues caused by use of inconsistent development environments. The continuous development and delivery system provides approved software updates to the corporate production system for development.

To further simplify and streamline the software development and delivery process, the continuous development and delivery system automates transmission of the software updates between the developer client device and the continuous software development and delivery system. For example, rather than the developer manually transmitting a software update to the continuous software development and delivery system, the developer simply saves the software update to a central source code repository. The continuous software development and delivery system employs listeners that are triggered when a software update is saved to the continuous software development and delivery system. The continuous software development and delivery system accesses the software update from the central source code repository. Similarly, the continuous software development and delivery system may store results of tests run on the software update in the central source code repository, which may be accessed by the developer.

FIG. 1 shows a system wherein a continuous software development and delivery system automates the software development and delivery process, according to some example embodiments. As shown, multiple devices (i.e., client device 102, client device 104, continuous software development and delivery system 106, and corporate production system 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communications links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the computing system 600 shown in FIG. 6.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users interact with the digital document system 106 using the client devices 102 and 104 that are connected to the communication network 110 by direct and/or indirect communication. Although the shown system 100 includes only two client devices 102, 104, this is only for ease of explanation and is not meant to be limiting. One skilled in the art would appreciate that the system 100 can include any number of client devices 102, 104. Further, the digital document system 106 may concurrently accept connections from and interact with any number of client devices 102, 104. The digital document system 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems; and so forth.

A user interacts with the continuous software development and delivery system 106 via a client-side application installed on the client devices 102 and 104. In some embodiments, the client-side application includes a component specific to the continuous software development and delivery system 106. For example, the component may be a stand-alone application, one or more application plug-ins, and/or a browser extension. However, the users may also interact with the continuous software development and delivery system 106 via a third-party application, such as a web browser, that resides on the client devices 102 and 104 and is configured to communicate with the digital document system 106. In either case, the client-side application presents a user interface (UI) for the user to interact with the continuous software development and delivery system 106. For example, the user interacts with the continuous software development and delivery system 106 via a client-side application integrated with the file system or via a webpage displayed using a web browser application.

The continuous software development and delivery system 106 is one or more computing devices configured to facilitate an automated software development and delivery process. Currently, the software development and delivery process is complicated and time consuming. The process requires multiple checkpoints and human intervention to ensure that software updates do not cause errors in the existing software when implemented. Coordination throughout the development process is also problematic as developers may be using varying development environment that are different than the environment used to test and produce the software. The continuous development and delivery system 106 remedies these issues by providing a consistent development environment throughout the development process. This reduces issues that may arise from use of inconsistent development environments. The continuous development and delivery system also automates previously manual portions of the software development and delivery process, further simplifying and streamlining the process.

The continuous development and delivery system 106 uses containers running unified container images to provide a consistent development environment throughout the software development and delivery process from the developer's client device 102 to the continuous development and delivery system 106 and the corporate production system 108. For example, during the development process, the continuous development and delivery system 106 and the client devices 102, 104 generate containers running a consistent container image that is as close as possible to the container image used by the corporate production system during development. A container image is an unchangeable, static file that includes executable code to an isolated process on a computing device. The image is comprised of system libraries, system tools and other platforms settings a software program uses to run on a containerization platform such as Docker.

The continuous development and delivery system 106 generates a container on the developer's client device 102 using a container image selected from a set of unified container images (e.g., unified docker images) maintained in a central container image repository available to the continuous development and delivery system 106. The source code and dependencies for a software application are pulled into the generated container by the client device 102 from a central software repository. Once the source code and dependencies are loaded into the container on the client device 102, the developer can begin work on creating updates to the software application in the generated developer environment.

The client device 102 provides updated versions of the source code to the continuous development and delivery system 106 for testing. This may include multiple rounds of testing as well as various levels of testing. The continuous development and delivery system 106 generates a container using the same selected container image from the central container image repository and uses the generated container to run tests of the updated version of the source code. As a result, the software update is developed and tested in a consistent development environment on both the developer's client device 102 and the continuous development and delivery system 106, thereby eliminating issues that may arise from use of inconsistent development environments.

The continuous development and delivery system 106 also automates previously manual portions of the software development and delivery process, further simplifying and streamlining the process. For example, the continuous development and delivery system 106 automates transmission of the software updates between the developer client device 102 and the continuous software development and delivery system 106. That is, rather than the developer manually transmitting a software update to the continuous software development and delivery system 106, the developer simply uses their client device 102 to save the software update to a central source code repository. The continuous software development and delivery system 106 employs listeners that are triggered when a software update is saved to the continuous software development and delivery system 106. The continuous software development and delivery system 106 accesses the software update from the central source code repository. Similarly, the continuous software development and delivery system 106 may store results of tests run on the software update in the central source code repository, which may be accessed by the developer.

The continuous development and delivery system 106 provides approved software updates (e.g., software updates that have satisfied all tests) to the corporate production system 108 for production. The corporate production system 108 is tasked with production of the software update. For example, the continuous development and delivery system 106 provides the corporate production system 108 with the data needed to produce the software update such as a snapshot of the software update, sources, dependencies, etc.

Figure 2:
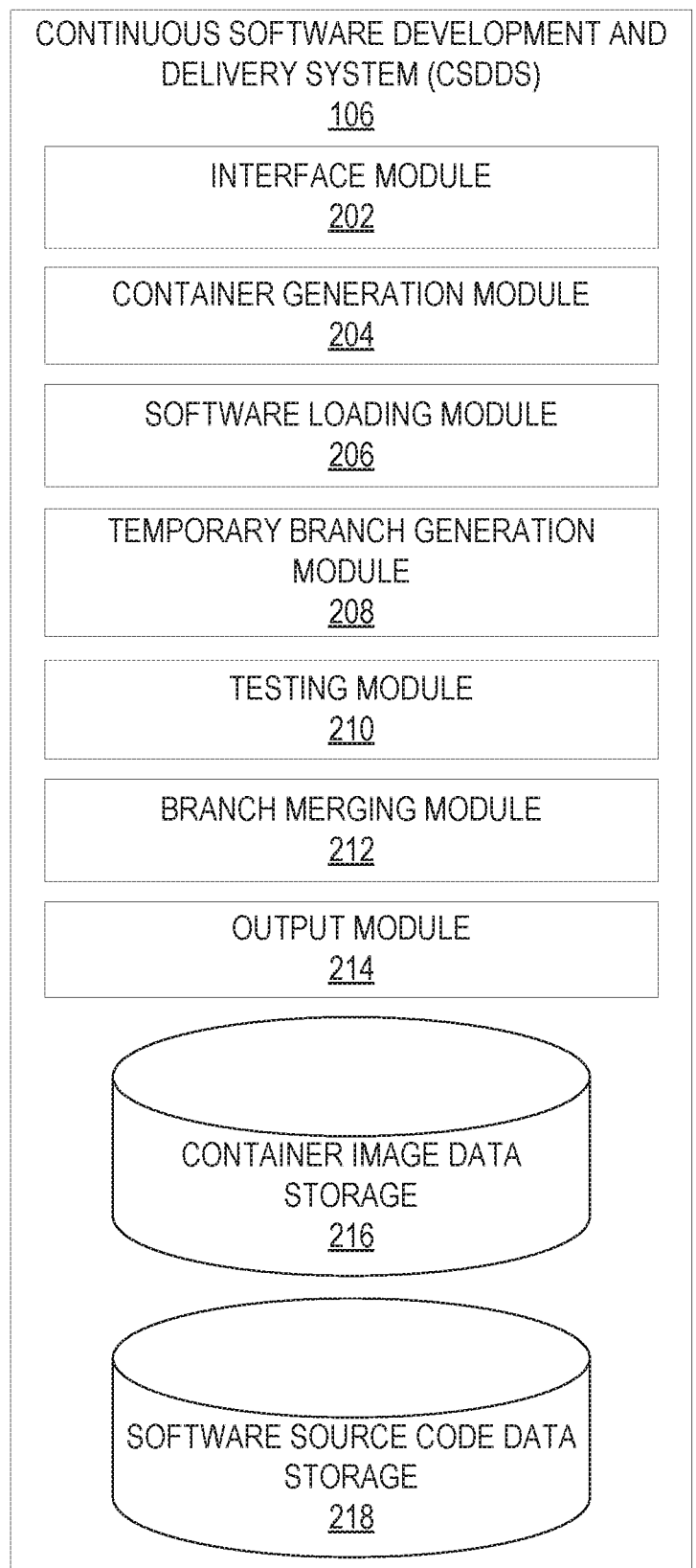
FIG. 2 is a block diagram of the continuous development and delivery system, according to some example embodiments.

FIG. 2 is a block diagram of the continuous development and delivery system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the continuous development and delivery system 106 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the continuous development and delivery system 106 includes an interface module 202, a container generation module 204, a software loading module 206, a temporary branch generation module 208, a testing module 210, a branch merging module 212, an output module 214, a container image data store 216 and a software source code data store 218.

The interface module 202 provides a development interface that enables developers to utilize the functionality of the continuous development and delivery system 106 to develop software updates. For example, the development interface includes user interface element (e.g., text fields, buttons, etc.) that enable a develop to user their client device 102 to request to develop software, select an appropriate container image, select a software application to pull into the generated developer environment, etc. The interface module 202 may provide data and/or commands to the other modules of the continuous development and delivery system 106 based on the user's selections or input via development interface. Similarly, the interface module 202 may output any data received by the other module of the continuous development and delivery system 106 to the developer via the development interface.

The container generation module 204 generates a container based on a selected container image. A container is a standard unit of software that packages up software source code and its dependencies to provide an application that runs quickly and reliably from one computing environment to another. A container image is a lightweight, standalone, executable package of software that includes everything needed to run an application: code, runtime, system tools, system libraries, settings, etc. The container image defines the development environment to be used during the application development and delivery process.

The container images are stored in the container image data store 216. The container generation module 204 communicates with the container image data store 216 to gather the selected container image. For example, the container generation module 204 receives data identifying the selected container image from the interface module 202. The container generation module 204 then uses the received data to gather the selected container image from the container image data store 216. Once gathered, the container generation module 204 generates a container based on the gathered container image. The container generation module 204 may generate the container on a developer's client device 102 and/or the continuous software development and delivery system 106. For example, the container generation module 204 may generate the container on a developer's client device 102 to allow the developer to develop software. Alternatively, the container generation module 204 may generate the container on the continuous software development and delivery system 106 to test software developed by a developer.

The software loading module 206 loads source code for a selected application into a generated container. The source code is stored in the software source code data storage 218. The software loading module 206 communicates with the software source code data storage 218 to gather the selected software source code. For example, the software loading module 206 receives data identifying the selected application source code from the interface module 202. The software loading module 206 then uses the received data to gather the selected software source code from the software source code data storage 218. Once the software source code is gathered from the software source code data storage 218, the software loading module 206 loads the software source code into the generated container. A developer may then generate modifications to the application source code within the developer environment provided by the software container.

A developer that has completed an update to the software source code may provide the software update to the continuous development and delivery system 106 for testing by storing the update to the software source code to the software source code data storage 218. The continuous software development and delivery system 106 employs listeners that are triggered when a software update is saved to the software source code data storage 218. The continuous software development and delivery system 106 accesses the software update from the software source code data storage 218.

Similarly, the continuous software development and delivery system 106 may store results of tests run on the software update in the software source code data storage 218, which may be accessed by the developer.

As explained earlier, containers running a consistent container image are used to provide a consistent developer environment by the continuous development and delivery system 106 during the testing phase. Accordingly, the container generation module 204 gathers the appropriate container image form the container image data storage 216 (e.g., the same container image used to generate the container on the developer's client device 102) and generates a container based on the container image. This provides a consistent developer environment for testing the software update as was used to develop the software update.

The testing may be performed in multiple stages. For example, the software update may initially be tested using minimal tests such as sanity tests. Once these minimal tests are satisfied (e.g., no errors or issues are found during the test) a more comprehensive and substantial (e.g., longer duration) set of tests may be performed on the software update.

The temporary branch generation module 208 generates a temporary branch of the application source code. The temporary branch is used during an initial set of tests, such as sanity tests, unit tests, integration tests, etc. The testing module 210 performs the tests on the software update. The testing module 210 generates a report indicating the results of the tests, which may be returned to the developer's client device 102. For example, the report may be transmitted to the user directly via a communication channel such as an instant messenger, email, etc. Alternatively, the report may be saved to the software source code data storage 218, where it can be accessed by the developer. The report may include errors detected during the tests. The report can be presented in a user interface on the client device 102. A developer uses the report to revise the software update as needed to remove identified errors.

In the event that the software update satisfies the initial set of tests, the testing module 210 may automatically notify the branch merging module 212 to merge the temporary branch into the application source code. The testing module 210 may then execute a second set of comprehensive tests. The set of comprehensive tests may include tests that take longer to perform as well rerunning tests included in the initial set of tests run by the testing module 210.

The testing module 210 generates a report indicating the results of the subsequent tests, which may be returned to the developer's client device 102. For example, the report may include errors detected during the tests. The report can be presented in a user interface on the client device 102. A developer uses the report to revise the software update as needed to remove identified errors.

In the event that a software update has satisfied all tests (e.g., initial set of tests, comprehensive set of tests, etc.), the output module 214 communicates with the corporate production system 108 to initiate production and release of the software update. For example, the output module 214 provides the corporate production system 108 with the needed data to produce the software update, such as a snapshot of the software update, sources, dependencies, etc.

Figure 3:
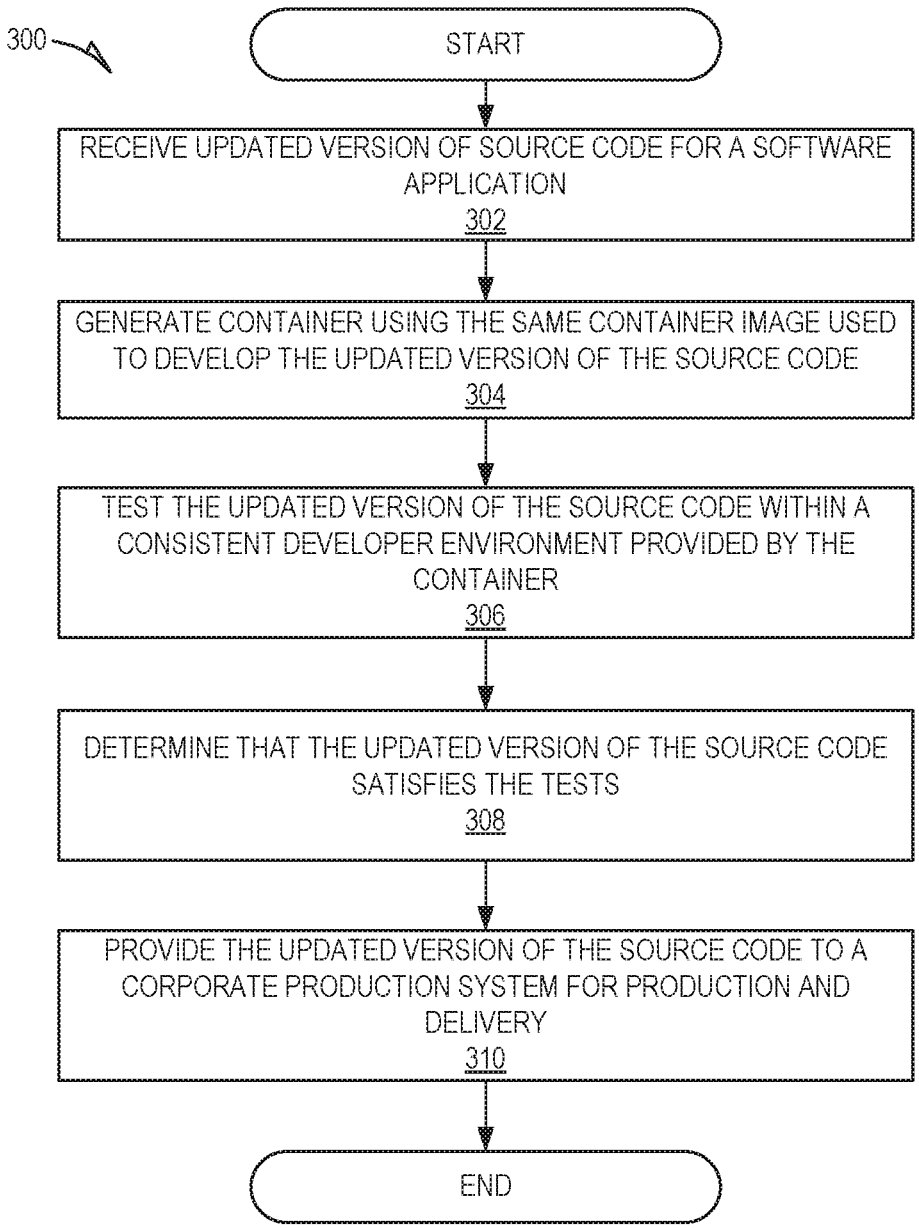
FIG. 3 is a flowchart showing an example method of continuous software development and delivery system, according to certain example embodiments.

FIG. 3 is a flowchart showing an example method 300 of continuous software development and delivery system, according to certain example embodiments. The method 300 may be embodied in computer readable instructions for execution by one or more processors such that the operations of the method 300 may be performed in part or in whole by the continuous software development and delivery system 106; accordingly, the method 300 is described below by way of example with reference thereto. However, it shall be appreciated that at least some of the operations of the method 300 may be deployed on various other hardware configurations and the method 300 is not intended to be limited to the continuous software development and delivery system 106.

At operation 302, the interface module 202 receives an updated version of source code for a software application. The interface module 202 provides a development interface that enables developers to utilize the functionality of the continuous development and delivery system 106 to develop software updates. For example, the development interface includes user interface element (e.g., text fields, buttons, etc.) that enable a develop to user their client device 102 to request to develop software, select an appropriate container image, select a software application to pull into the generated developer environment, etc. The interface module 202 may provide data and/or commands to the other modules of the continuous development and delivery system 106 based on the user's selections or input via development interface. Similarly, the interface module 202 may output any data received by the other module of the continuous development and delivery system 106 to the developer via the development interface.

The container generation module 204 then generates a container using the same container image used to develop the updated version of the source code (see operation 304). This step is described in greater detail below in relation to FIG. 4

Thereafter, as shown at operation 306, the testing module 210 tests the updated version of the source code within a consistent developer environment provided by the container. The testing module 210 may perform various sets of tests, as is described in relation to FIG. 5. The testing module 210 generates a report indicating the results of the tests, which may be returned to the developer's client device 102. For example, the report may include errors detected during the tests. The report can be presented in a user interface on the client device 102. A developer uses the report to revise the software update as needed to remove identified errors.

At operation 308, the testing module 210 determines that the updated version of the source code satisfies the tests. The output module 214 provides the updated version of the source code to a corporate production system for production and delivery (see operation 310). For example, the output module 214 provides the corporate production system 108 with the needed data to produce the software update, such as a snapshot of the software update, sources, dependencies, etc.

Figure 4:
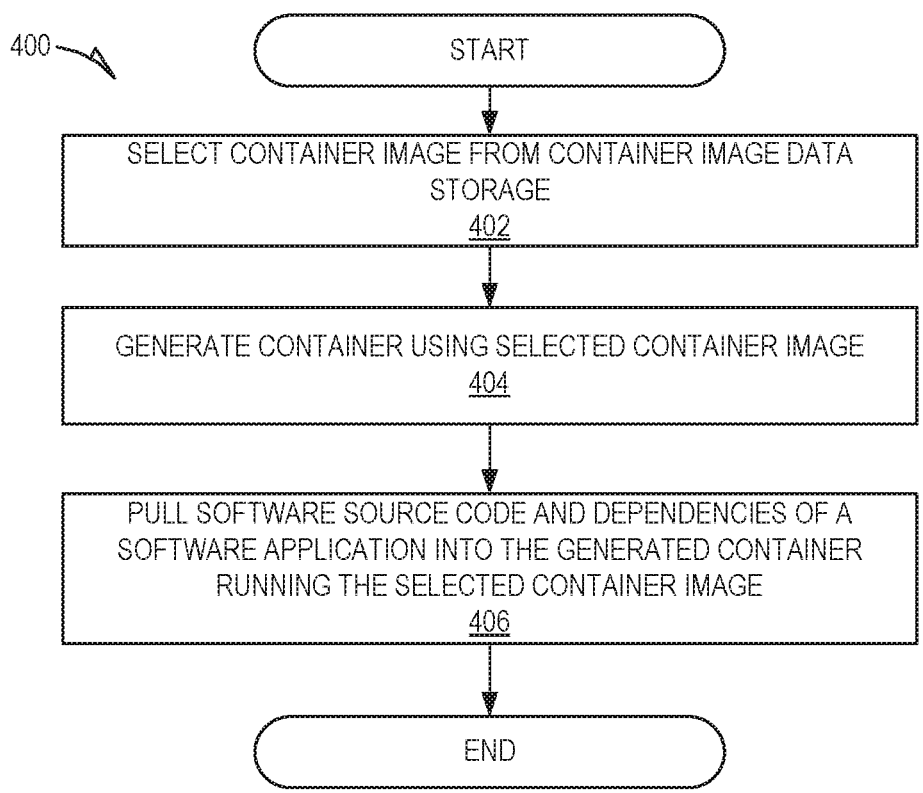
FIG. 4 is a flowchart showing an example method of generating a container providing a consistent development environment, according to certain example embodiments.

FIG. 4 is a flowchart showing an example method 400 of generating a container providing a consistent development environment, according to certain example embodiments. The method 400 may be embodied in computer readable instructions for execution by one or more processors such that the operations of the method 400 may be performed in part or in whole by the continuous software development and delivery system 106; accordingly, the method 400 is described below by way of example with reference thereto. However, it shall be appreciated that at least some of the operations of the method 400 may be deployed on various other hardware configurations and the method 400 is not intended to be limited to the continuous software development and delivery system 106.

At operation 402, the container generation module 204 selects a container image from the container image data storage. A container is a standard unit of software that packages up software source code and its dependencies to provide an application that runs quickly and reliably from one computing environment to another. A container image is a lightweight, standalone, executable package of software that includes everything needed to run an application: code, runtime, system tools, system libraries, settings, etc. The container image defines the development environment to be used during the application development and delivery process.

The container images are stored in the container image data store 216. The container generation module 204 communicates with the container image data store 216 to gather the selected container image. For example, the container generation module 204 receives data identifying the selected container image from the interface module 202. The container generation module 204 then uses the received data to gather the selected container image from the container image data store 216.

As shown at operation 404, the container generation module 204 generates a container using the selected container image. The container generation module 204 may generate the container on a developer's client device 102 and/or the continuous software development and delivery system 106. For example, the container generation module 204 may generate the container on a developer's client device 102 to allow the developer to develop software. Alternatively, the container generation module 204 may generate the container on the continuous software development and delivery system 106 to test software developed by a developer.

At operation 406, the software loading module 206 pulls software source code and dependencies of a software application into the generated container running the selected container image. The source code is stored in the software source code data storage 218. The software loading module 206 communicates with the software source code data storage 218 to gather the selected software source code. For example, the software loading module 206 receives data identifying the selected application source code from the interface module 202. The software loading module 206 then uses the received data to gather the selected software source code from the software source code data storage 218. Once the software source code is gathered from the software source code data storage 218, the software loading module 206 loads the software source code into the generated container. A developer may then generate modifications to the application source code within the developer environment provided by the software container.

Figure 5:
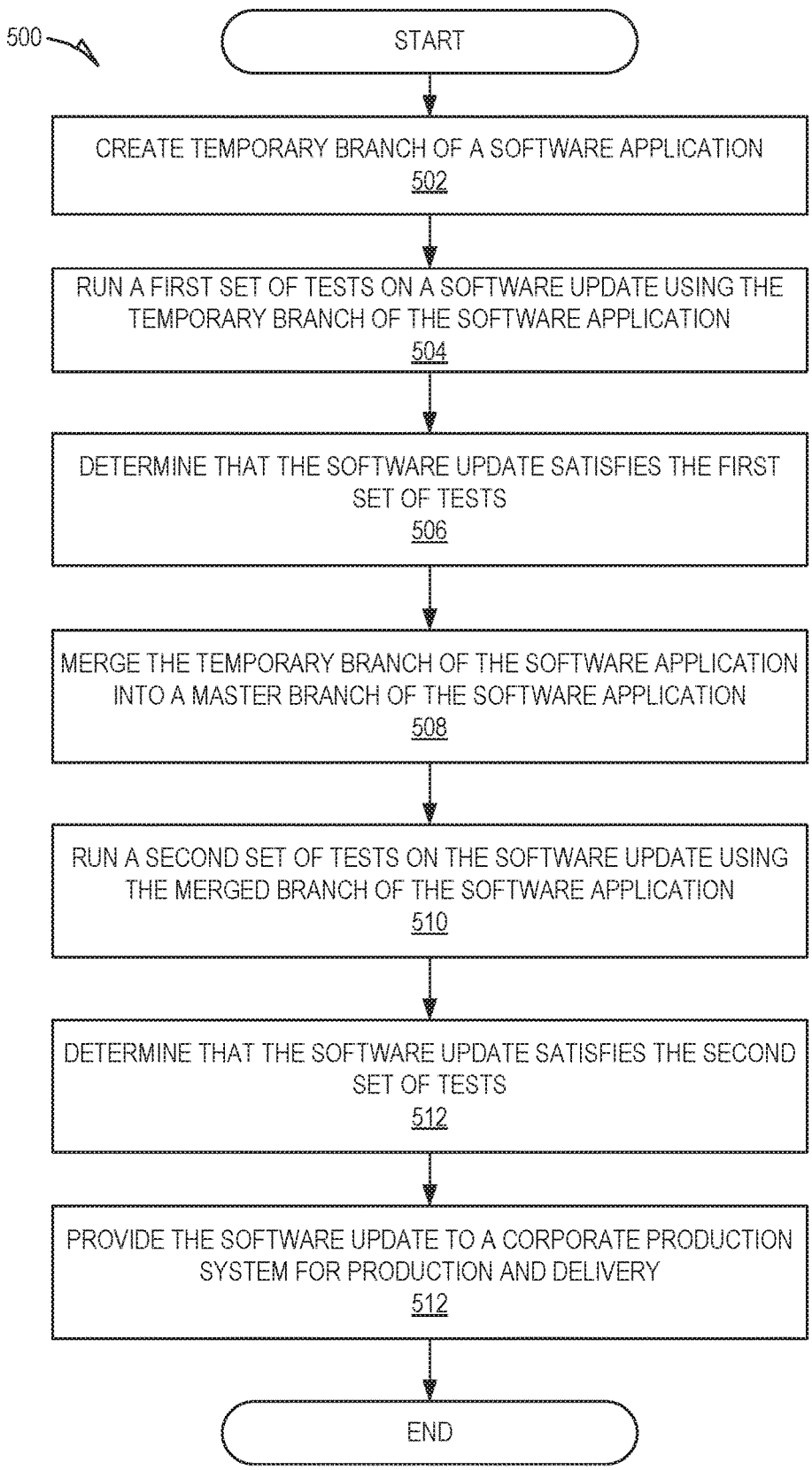
FIG. 5 is a flowchart showing an example method of continuous software development and delivery system, according to certain example embodiments.

FIG. 5 is a flowchart showing an example method 500 of continuous software development and delivery system, according to certain example embodiments. The method 500 may be embodied in computer readable instructions for execution by one or more processors such that the operations of the method 500 may be performed in part or in whole by the continuous software development and delivery system 106; accordingly, the method 500 is described below by way of example with reference thereto. However, it shall be appreciated that at least some of the operations of the method 500 may be deployed on various other hardware configurations and the method 500 is not intended to be limited to the continuous software development and delivery system 106.

At operation 502, the temporary branch generation module 208 creates a temporary branch of a software application. The temporary branch is used during an initial set of tests, such as sanity tests, unit tests, integration tests, etc.

At operation 504, the testing module 210 runs a first set of tests on a software update using the temporary branch of the software update. The testing module 210 generates a report indicating the results of the tests, which may be returned to the developer's client device 102. For example, the report may include errors detected during the tests. The report can be presented in a user interface on the client device 102. A developer uses the report to revise the software update as needed to remove identified errors.

At operation 506, the testing module 210 determines that the software update satisfies the first set of tests.

At operation 508, the branch merging module 212 merges the temporary branch of the software application into a master branch of the software application. The testing module 210 may then execute a second set of comprehensive tests. The set of comprehensive tests may include tests that take longer to perform as well rerunning tests included in the initial set of tests run by the testing module 210.

At operation 510, the testing module 210 runs a second set of tests on the software update using the merged branch of the software application.

At operation 512, the testing module 210 determines that the software update satisfies the second set of tests.

At operation 512, the output module 214 provides the software update to a corporate production system for production and delivery. For example, the output module 214 provides the corporate production system 108 with the needed data to produce the software update, such as a snapshot of the software update, sources, dependencies, etc.

EXAMPLES

Example 1 is a method comprising: receiving, from a developer client device, an updated version of a source code for a software application, the updated version of the source code having been generated using a first software container generated on the developer client device, the first software container running a first container image selected from a central container image repository, the first container image defining a first developer environment; generating, by one or more computer processors, a second software container running the first container image selected from the central container image repository, the second software container providing the first developer environment defined by the first container image; running, by the one or more computer processors, a first set of tests on the updated version of the source code for the software application within the second software container; and in response to the updated version of the source code satisfying the first set of tests, providing the updated version of the source code to a corporate production system for production and delivery.

In Example 2, the subject matter of Example 1 optionally includes after the updated version of the source code satisfying the first set of tests, generating a third software container running the first container image selected from the central container image repository, the third software container providing the first developer environment defined by the first container image; and running a second set of tests on the updated version of the source code for the software application within the third software container, wherein the updated version of the source code is provided to the corporate production system for production and delivery in response to the updated version of the source code satisfying both the first set of tests and the second set of tests.

In Example 3, the subject matter of Example 1 or Example 2 optionally includes creating a temporary branch of the software application, the temporary branch of the software application used to perform the first set of tests on the updated version of the source code.

In Example 4, the subject matter of Examples 1 to 3 optionally includes in response to the updated version of the source code satisfying the first set of tests, merging the temporary branch of the software application into a master branch of the software application and running the second set of tests on the updated version of the source code.

In Example 5, the subject matter of Examples 1 to 4 optionally includes determining that a previous updated version of the software application did not satisfy the first set of tests; and providing a report indicating results of the first set of tests to the developer client device.

In Example 6, the subject matter of Examples 1 to 5 optionally includes determining that a previous updated version of the software application did not satisfy the second set of tests; and providing a report indicating results of the second set of tests to the developer client device.

In Example 7, the subject matter of Examples 1 to 6 optionally includes wherein the second set of tests includes at least one test included in the first set of tests.

In Example 8, the subject matter of Examples 1 to 7 optionally includes wherein an amount of time to perform the second set of tests is greater than an amount of time to perform the first set of tests.

Example 9 is a system comprising: one or more computer processors; and one or more computer-readable mediums storing instructions that, when executed by the one or more computer processors, cause the system to perform operations comprising: receiving, from a developer client device, an updated version of a source code for a software application; the updated version of the source code having been generated using a first software container generated on the developer client device; the first software container running a first container image selected from a central container image repository, the first container image defining a first developer environment; generating a second software container running the first container image selected from the central container image repository, the second software container providing the first developer environment defined by the first container image; running a first set of tests on the updated version of the source code for the software application within the second software container; and in response to the updated version of the source code satisfying the first set of tests, providing the updated version of the source code to a corporate production system for production and delivery.

In Example 10, the subject matter of Example 9 optionally includes after the updated version of the source code satisfying the first set of tests, generating a third software container running the first container image selected from the central container image repository, the third software container providing the first developer environment defined by the first container image; and running a second set of tests on the updated version of the source code for the software application within the third software container, wherein the updated version of the source code is provided to the corporate production system for production and delivery in response to the updated version of the source code satisfying both the first set of tests and the second set of tests.

In Example 11, the subject matter of Example 9 or Example 10 optionally includes creating a temporary branch of the software application, the temporary branch of the software application used to perform the first set of tests on the updated version of the source code.

In Example 12, the subject matter of Examples 9 to 11 optionally includes in response to the updated version of the source code satisfying the first set of tests, merging the temporary branch of the software application into a master branch of the software application and running the second set of tests on the updated version of the source code.

In Example 13, the subject matter of Examples 9 to 12 optionally includes determining that a previous updated version of the software application did not satisfy the first set of tests; and providing a report indicating results of the first set of tests to the developer client device.

In Example 14, the subject matter of Examples 9 to 13 optionally includes determining that a previous updated version of the software application did not satisfy the second set of tests; and providing a report indicating results of the second set of tests to the developer client device In Example 15, the subject matter of Examples 9 to 14 optionally includes wherein the second set of tests includes at least one test included in the first set of tests.

In Example 16, the subject matter of Examples 9 to 15 optionally includes wherein an amount of time to perform the second set of tests is greater than an amount of time to perform the first set of tests.

Example 17 is a non-transitory computer-readable medium storing instructions that, when executed by one or more computer processors of a computing system, cause the computing system to perform operations comprising: receiving; from a developer client device, an updated version of a source code for a software application, the updated version of the source code having been generated using a first software container generated on the developer client device; the first software container running a first container image selected from a central container image repository, the first container image defining a first developer environment; generating a second software container running the first container image selected from the central container image repository, the second software container providing the first developer environment defined by the first container image; running a first set of tests on the updated version of the source code for the software application within the second software container; and in response to the updated version of the source code satisfying the first set of tests, providing the updated version of the source code to a corporate production system for production and delivery.

In Example 18, the subject matter of Example 17 optionally includes after the updated version of the source code satisfying the first set of tests, generating a third software container running the first container image selected from the central container image repository, the third software container providing the first developer environment defined by the first container image; and running a second set of tests on the updated version of the source code for the software application within the third software container, wherein the updated version of the source code is provided to the corporate production system for production and delivery in response to the updated version of the source code satisfying both the first set of tests and the second set of tests.

In Example 19, the subject matter of Example 17 or Example 18 optionally includes creating a temporary branch of the software application, the temporary branch of the software application used to perform the first set of tests on the updated version of the source code.

In Example 20, the subject matter of Examples 17 to 19 optionally includes in response to the updated version of the source code satisfying the first set of tests, merging the temporary branch of the software application into a master branch of the software application and running the second set of tests on the updated version of the source code.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by, software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Machine Architecture

Figure 6:
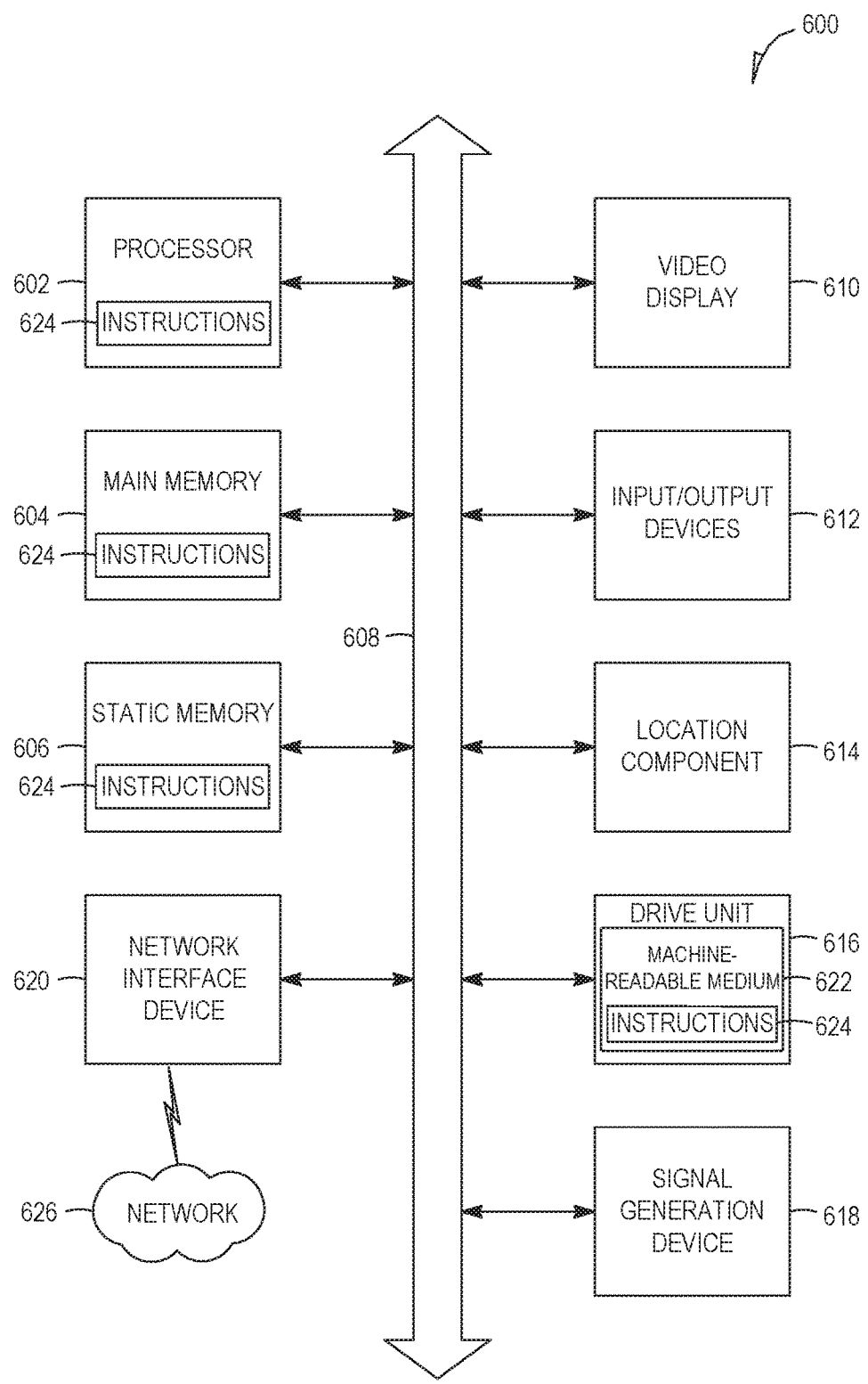
FIG. 6 is a diagrammatic representation of a machine in the example form of a computer system within which a set of instructions for causing the machine to perform any one or more of the methodologies discussed herein may be executed.

FIG. 6 is a diagrammatic representation of a machine in the example form of a computer system 600 within which a set of instructions for causing the machine to perform any one or more of the methodologies discussed herein may be executed. The computer system 600 may include instructions for causing the machine to perform any one or more of the methodologies discussed herein. In alternative embodiments, the machine operates as a standalone de-vice or may be connected (e.g., networked) to other machines. In a networked deployment, the machine may operate in the capacity of a server or a client machine in a server-client network environment, or as a peer machine in a peer-to-peer (or distributed) network environment.

The machine may, for example, be a personal computer (PC), a PDA, a cellular telephone, a smart phone (e.g., iPhone®), a tablet computer, a web appliance, a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, a video game system console, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604, and a static memory 606, which communicate with each other via a bus 608. The computer system 600 may further include a video display 610 (e.g., a liquid crystal display (LCD) or a cathode ray tube (CRT)). The computer system 600 also includes one or more input/output (I/O) devices 612, a location component 614, a drive unit 616, a signal generation device 618 (e.g., a speaker), and a network interface device 620. The I/O devices 612 may, for example, include a keyboard, a mouse, a keypad, a multi-touch surface (e.g., a touchscreen or track pad), a microphone, a camera, and the like.

The location component 614 may be used for determining a location of the computer system 600. In some embodiments, the location component 614 may correspond to a GPS transceiver that may make use of the network interface device 620 to communicate GPS signals with a GPS satellite. The location component 614 may also be configured to determine a location of the computer system 600 by using an internet protocol (IP) address lookup or by triangulating a position based on nearby mobile communications towers. The location component 614 may be further configured to store a user-defined location in main memory 604 or static memory 606. In some embodiments, a mobile location enabled application may work in conjunction with the location component 614 and the network interface device 620 to transmit the location of the computer system 600 to an application server or third party server for the purpose of identifying the location of a user operating the computer system 600.

In some embodiments, the network interface device 620 may correspond to a transceiver and antenna. The transceiver may be configured to both transmit and receive cellular network signals, wireless data signals, or other types of signals via the antenna, depending on the nature of the computer system 600.

Machine-Readable Medium

The drive unit 616 includes a machine-readable medium 622 on which is stored one or more sets of data structures and instructions 624 (e.g., software) embodying or used by any one or more of the methodologies or functions described herein. The instructions 624 may also reside, completely or at least partially, within the main memory 604, the static memory 606, and/or the processor 602 during execution thereof by the computer system 600, with the main memory 604, the static memory 606, and the processor 602 also constituting machine-readable media.

Consistent with some embodiments, the instructions 624 may relate to the operations of an operating system (OS). Depending on the particular type of the computer system 600, the OS may, for example, be the iOS® operating system, the Android® operating system, a BlackBerry® operating system, the Microsoft® Windows® Phone operating system, Symbian® OS, or webOS®. Further, the instructions 624 may relate to operations performed by applications (commonly known as "apps"), consistent with some embodiments. One example of such an application is a mobile browser application that displays content, such as a web page or a user interface using a browser.

While the machine-readable medium 622 is shown in an example embodiment to be a single medium, the term "machine-readable medium" may include a single medium or multiple media a centralized or distributed database, and/or associated caches and servers) that store the one or more data structures or instructions 624. The term "machine-readable medium" shall also be taken to include any tangible medium that is capable of storing, encoding; or carrying instructions (e.g., instructions 624) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium "non-transitory" should not be construed to mean that the medium is incapable of movement the medium should be considered as being transportable from one real-world location to another. Additionally, since the machine-readable medium is tangible, the medium may be considered to be a machine-readable device.

Transmission Medium

The instructions 624 may further be transmitted or received over a network 626 using a transmission medium. The instructions 624 may be transmitted using the network interface device 620 and any one of a number of well-known transfer protocols (e.g., HTTP). Examples of communication networks include a LAN; a WAN, the Internet, mobile telephone networks, plain old telephone service (POTS) networks, and wireless data networks (e.g., WiFi and WiMax networks). The term "transmission medium" shall be taken to include any intangible medium that is capable of storing, encoding, or carrying the instructions 624 for execution by the machine, and includes digital or analog communications signals or other intangible media to facilitate communication of such software.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications; patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:

using one or more listeners to detect when a developer client device has saved, in a source code data storage, an updated version of a source code for a software application for which an original version of the source code was previously created, the updated version of the source code having been created on the developer client device using a first software container, the first software container running a first container image selected from a central container image repository, the first container image defining a first developer environment, the first developer environment containing tools to code and test the source code;

in response to the detecting, generating, by one or more computer processors, a second software container running the first container image selected from the central container image repository, the second software container providing the first developer environment defined by the first container image;

running, by the one or more computer processors, a first set of tests on the updated version of the source code for the software application within the second software container;

in response to the updated version of the source code satisfying the first set of tests, providing the updated version of the source code to a corporate production system for production and delivery;

after the updated version of the source code satisfying the first set of tests, generating a third software container running the first container image selected from the central container image repository, the third software container providing the first developer environment defined by the first container image; and running a second set of tests on the updated version of the source code for the software application within the third software container, wherein the updated version of the source code is provided to the corporate production system for production and delivery in response to the updated version of the source code satisfying both the first set of tests and the second set of tests, wherein an amount of time to perform the second set of tests is greater than an amount of time to perform the first set of tests.

2. The method of claim 1, further comprising:
creating a temporary branch of the software application, the temporary branch of the software application used to perform the first set of tests on the updated version of the source code.

3. The method of claim 2, further comprising:
in response to the updated version of the source code satisfying the first set of tests, merging the temporary branch of the software application into a master branch of the software application and running the second set of tests on the updated version of the source code.

4. The method of claim 1, further comprising:
determining that a previous updated version of the software application did not satisfy the first set of tests; and
providing a report indicating results of the first set of tests to the developer client device.

5. The method of claim 1, further comprising:
determining that a previous updated version of the software application did not satisfy the second set of tests; and
providing a report indicating results of the second set of tests to the developer client device.

6. The method of claim 1, wherein the second set of tests includes at least one test included in the first set of tests.

7. A system comprising:
one or more computer processors; and
one or more computer-readable mediums storing instructions that, when executed by the one or more computer processors, cause the system to perform operations comprising:
using one or more listeners to detect when a developer client device has saved, in a source code data storage, an updated version of a source code for a software application for which an original version of the source code was previously created, the updated version of the source code having been created on the developer client device using a first software container, the first software container running a first container image selected from a central container image repository, the first container image defining a first developer environment, the first developer environment containing tools to code and test the source code;
in response to the detecting, generating, by one or more computer processors, a second software container running the first container image selected from the central container image repository, the second software container providing the first developer environment defined by the first container image;
running, by the one or more computer processors, a first set of tests on the updated version of the source code for the software application within the second software container;
in response to the updated version of the source code satisfying the first set of tests, providing the updated version of the source code to a corporate production system for production and delivery;
after the updated version of the source code satisfying the first set of tests, generating a third software container running the first container image selected from the central container image repository, the third software container providing the first developer environment defined by the first container image; and
running a second set of tests on the updated version of the source code for the software application within the third software container, wherein the updated version of the source code is provided to the corporate production system for production and delivery in response to the updated version of the source code satisfying both the first set of tests and the second set of tests, wherein an amount of time to perform the second set of tests is greater than an amount of time to perform the first set of tests.

8. The system of claim 7, the operations further comprising:
creating a temporary branch of the software application, the temporary branch of the software application used to perform the first set of tests on the updated version of the source code.

9. The system of claim 8, the operations further comprising:
in response to the updated version of the source code satisfying the first set of tests, merging the temporary branch of the software application into a master branch of the software application and running the second set of tests on the updated version of the source code.

10. The system of claim 7, the operations further comprising:
determining that a previous updated version of the software application did not satisfy the first set of tests; and
providing a report indicating results of the first set of tests to the developer client device.

11. The system of claim 7, the operations further comprising:
determining that a previous updated version of the software application did not satisfy the second set of tests; and
providing a report indicating results of the second set of tests to the developer client device.

12. The system of claim 7, wherein the second set of tests includes at least one test included in the first set of tests.

13. A non-transitory computer-readable medium storing instructions that, when executed by one or more computer processors of a computing system, cause the computing system to perform operations comprising:
using one or more listeners to detect when a developer client device has saved, in a source code data storage, an updated version of a source code for a software application for which an original version of the source code was previously created, the updated version of the source code having been created on the developer client device using a first software container, the first software container running a first container image selected from a central container image repository, the first container image defining a first developer environment, the first developer environment containing tools to code and test the source code;
in response to the detecting, generating, by one or more computer processors, a second software container running the first container image selected from the central container image repository, the second software container providing the first developer environment defined by the first container image;

running, by the one or more computer processors, a first set of tests on the updated version of the source code for the software application within the second software container;

in response to the updated version of the source code satisfying the first set of tests, providing the updated version of the source code to a corporate production system for production and delivery;

after the updated version of the source code satisfying the first set of tests, generating a third software container running the first container image selected from the central container image repository, the third software container providing the first developer environment defined by the first container image; and running a second set of tests on the updated version of the source code for the software application within the third software container, wherein the updated version of the source code is provided to the corporate production system for production and delivery in response to the updated version of the source code satisfying both the first set of tests and the second set of tests, wherein an amount of time to perform the second set of tests is greater than an amount of time to perform the first set of tests.

14. The non-transitory computer-readable medium of claim 13, the operations further comprising:

creating a temporary branch of the software application, the temporary branch of the software application used to perform the first set of tests on the updated version of the source code.

15. The non-transitory computer-readable medium of claim 14, the operations further comprising:

in response to the updated version of the source code satisfying the first set of tests, merging the temporary branch of the software application into a master branch of the software application and running the second set of tests on the updated version of the source code.

\* \* \* \* \*